Figure 1:
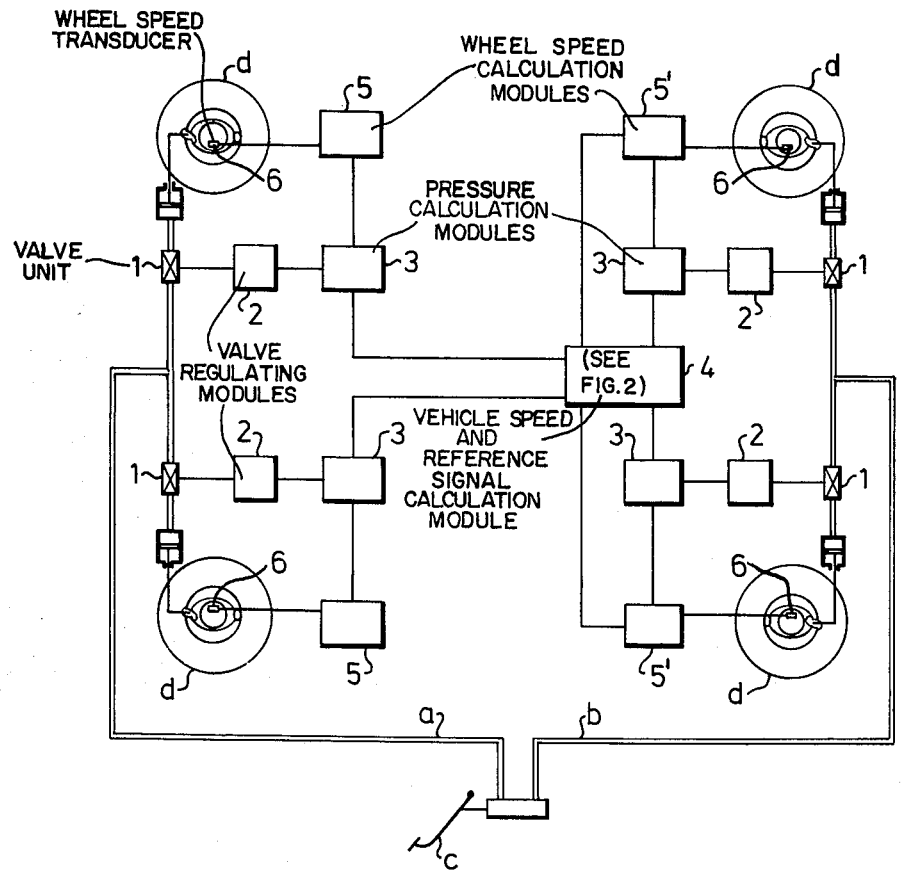

United States Patent [19]

Öberg

[11] 4,089,564
[45] May 16, 1978

[54] METHOD AND APPARATUS FOR PREDICTING VEHICLE SPEED IN BRAKING CONTROL SYSTEMS FOR WHEELED VEHICLES

[75] Inventor: Ulf Erik Öberg, Goteborg, Sweden

[73] Assignee: Saab-Scania Aktiebolag, Sodertalje, Sweden

[21] Appl. No.: 730,293

[22] Filed: Oct. 6, 1976

Related U.S. Application Data

[63] Continuation of Ser. No. 557,904, Mar. 13, 1975, abandoned.

[30] Foreign Application Priority Data

Mar. 18, 1974 Sweden ............................ 7403585

[51] Int. Cl.² .......................................... B60T 8/10
[52] U.S. Cl. ............................... 303/109; 188/181 C; 361/238
[58] Field of Search ............. 73/507; 180/82 R, 82 B, 180/105 E; 188/181 A, 181 C; 235/150.2; 303/20, 109, 106, 97; 307/10 R; 317/5; 324/161; 340/53, 62; 361/238

[56] References Cited

U.S. PATENT DOCUMENTS

| | | | |
|---|---|---|---|
| 3,650,575 | 3/1972 | Okamoto | 303/109 |
| 3,653,727 | 4/1972 | Kullberg et al. | 303/106 |
| 3,744,849 | 7/1973 | Jonason et al. | 303/109 |
| 3,768,873 | 10/1973 | Hirzel | 303/109 |
| 3,804,470 | 4/1974 | Slavin et al. | 303/109 |
| 3,811,739 | 5/1974 | Nakamura et al. | 303/109 |
| 3,847,447 | 11/1974 | Needham et al. | 303/97 |
| 3,848,933 | 11/1974 | Ochiai | 303/109 |
| 3,871,715 | 3/1975 | Hikida et al. | 303/109 |

*Primary Examiner*—Stephen G. Kunin
*Attorney, Agent, or Firm*—Louis Weinstein

[57] ABSTRACT

A method for predicting vehicle speed in a braking control system for wheeled vehicles, where a signal representing wheel speed before braking is used to trigger charging of a capacitor in an electronic unit. The capacitor voltage is reduced during braking in response to a predetermined retardation value in order to correspond to an instantaneous value for the vehicle speed. The vehicle speed signal is compared with a wheel speed signal, which comparison triggers, when the wheel speed signal exceeds the vehicle speed signal, up-dating of the capacitor voltage level to a value corresponding to the actual wheel speed signal. When up-dating the vehicle speed signal, the preselected retardation value is gradually lowered by a value corresponding to the magnitude of the actual up-dating.

13 Claims, 3 Drawing Figures

METHOD AND APPARATUS FOR PREDICTING VEHICLE SPEED IN BRAKING CONTROL SYSTEMS FOR WHEELED VEHICLES

This is a continuation of Application Ser. No. 557,904, filed Mar. 13, 1975, now abandoned.

The present invention relates to a method of predicting vehicle speed in a braking control system for wheeled vehicles comprising measuring means for wheel speed sensing, and an electronic unit which generates an electrical signal representing the instantaneous slip of a vehicle wheel during braking, in response to the predicted speed of the individual wheel and the vehicle, at least one signal representing the wheel speed before braking being applied to a comparator circuit in a central module in the electronic unit to trigger charging of a capacitor, the capacitor voltage being discharged during braking in response to a preselected empirical retardation value in the central module to correspond to an instantaneous value for the vehicle speed, said instantaneous vehicle speed signal corresponding hereto being returned during a braking operation to the comparator circuit and compared with at least one instantaneous wheel speed signal, the latter signal triggering, when the vehicle speed signal is exceeded, up-dating of the capacitor voltage level to assume a value corresponding to the instantaneous wheel speed signal.

In braking it is a well-known problem that when the braking moment on a wheel becomes larger than the road moment, the wheel will skid. The result of this may be that the braking capacity of the wheel is decreased simultaneously as steering capacity is wholly or partly lost.

The braking force which is obtained in the contact between wheel and substructure during braking is dependent on many factors, such as the nature of the substructure and the wheel, the speed of the vehicle, wheel loading, prevailing temperature, etc. For each combination of such conditions the frictional conditions can be described by a characteristic graph in a coordinate system which defines braking force on the wheel as a function of the wheel slip. "Slip" in this case means the difference between the speed of the vehicle and the wheel in relation to the speed of the vehicle. By "wheel speed" is meant here; and in what follows, the rotational speed of the wheel. Characteristic for such a braking force graph is that braking force is only present when the slip deviates from zero. With increasing slip, the braking force increases to a maximum, whereafter it diminishes once again. To obtain adequate braking ability for a vehicle it is consequently necessary to strive for an individual vehicle wheel slip value which corresponds to maximum braking force under prevailing conditions.

Control systems of the kind in question are previously known for preventing landing gear wheels in aircraft from skidding. However, such braking systems require such complicated and expensive electronic equipment that utilization of such systems for other kinds of wheeled vehicles, e.g. automobiles, appears quite unfeasible.

With simpler kinds of braking control systems it is also known to obtain information on vehicle speed with guidance from vehicle speed measured at the wheels of the vehicle before braking, a signal corresponding thereto being stored in a memory and used as a reference magnitude for the vehicle speed during a complete braking operation. However, large deviations from the instantaneous vehicle speed can hereby arise, which in turn results in incorrect braking control.

Through the Swedish Patent No. 338,725 it is further known to measure vehicle speed with the assistance of a simple accelerometer and to up-date a signal given by it with signals from measuring means sensing wheel speed for at least one intermittently free-wheeling wheel on the vehicle. The price of such an accelerometer increases, however, with increased demand for accuracy, and as a result thereof one generally has to use accelerometers having reduced reliability. In spite of this fact, it is in many cases uneconomical to use such a measuring instrument.

The present invention has the object of predicting vehicle speed in a braking control system for wheeled vehicles in such a way that the need for an accelerometer or a similar measuring instrument for vehicle speed is eliminated.

The method according to the invention is distinguished in that the preselected retardation value in the central module is lowered at a first up-dating of the vehicle speed signal by a value proportional to the magnitude of the first up-dating, thereafter the new retardation value is lowered at a second up-dating by a value proportional to the magnitude of the second up-dating etc.

The empirically chosen retardation value in the central module may, in the method according to the invention, advantageously be set to correspond to the earth's gravitational acceleration, 1 g, but within the framework of the inventive idea the retardation can be set to values down to 0.5 g.

The method according to the invention is further distinguished in that the preselected, and during up-dating, reduced, retardation value in the central module is represented by the output signal from an operational amplifier connected as an integrator in a retardation calculating stage.

Also, between up-datings of the vehicle speed signal the retardation value is continuously increased independently of the vehicle speed signal.

In those cases where the wheel speed signal does not up-date the vehicle speed signal, a time comparator triggers reswitching of the retardation value to the original value.

Figure 2:
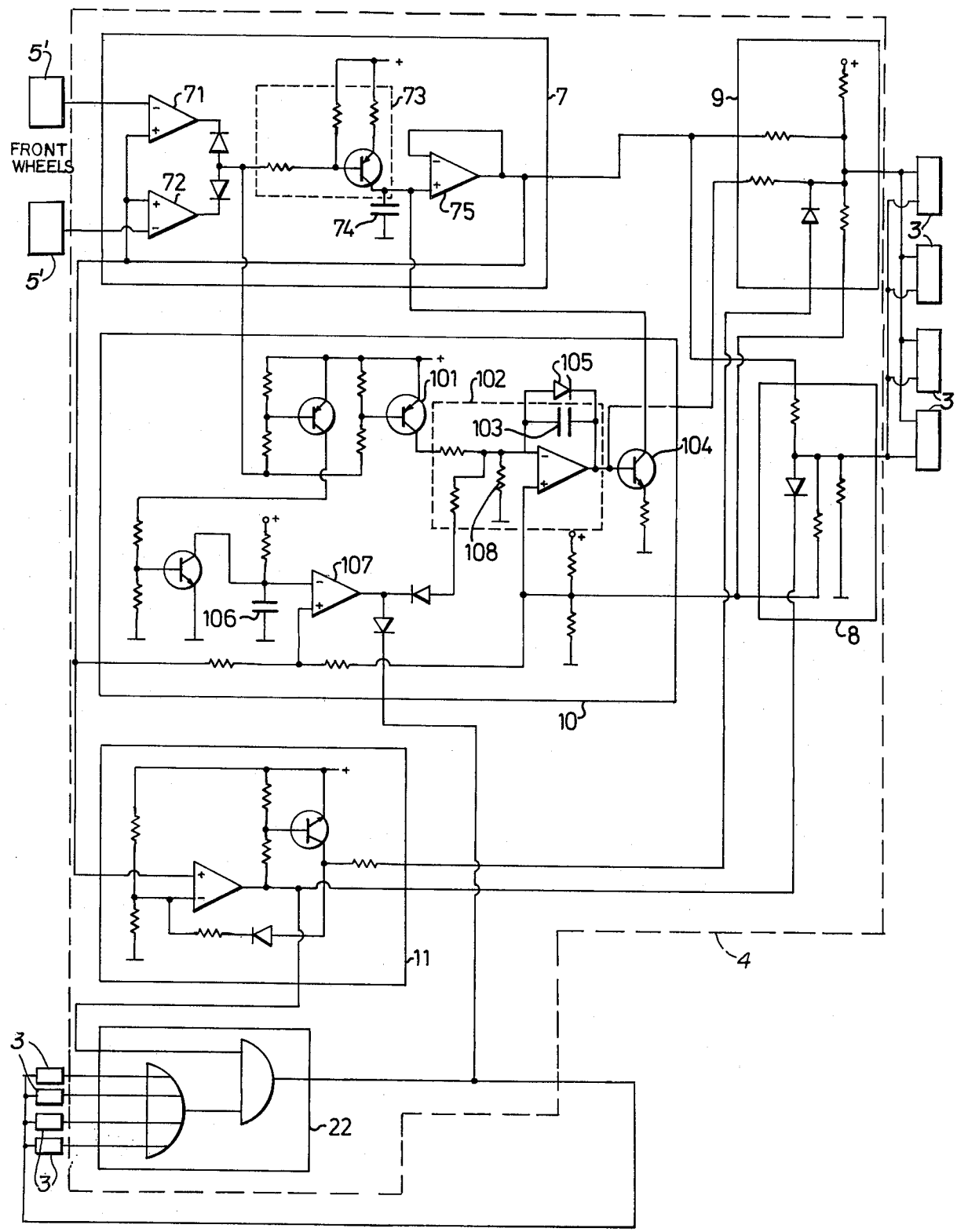
Figure 3:
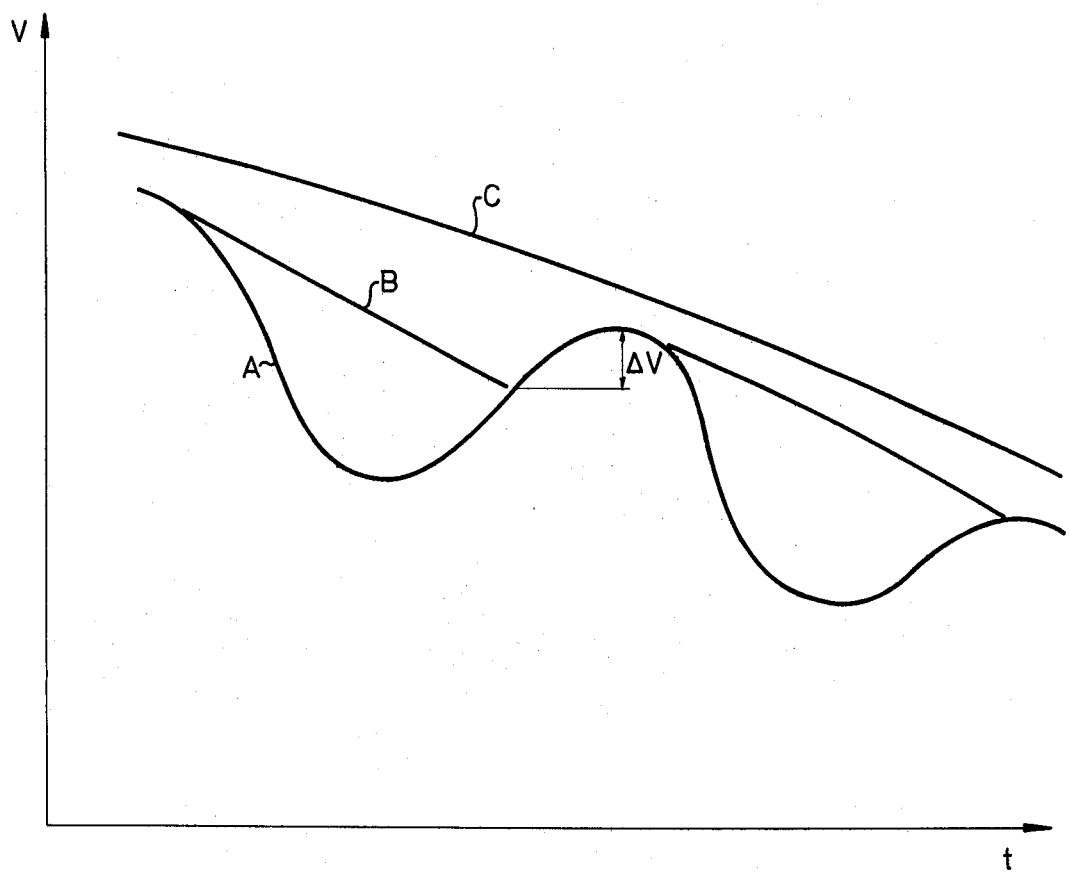

The invention will now be described in greater detail below while referring to the accompanying drawings of a braking control system exemplifying the invention, where FIG. 1 shows a block diagram of the control system installed in a vehicle, FIG. 2 shows a block diagram for a central module incorporated in the electronic unit, and FIG. 3 illustrates wth a graph the up-dating of a vehicle speed signal.

The braking regulation system exemplified in FIG. 1 is fitted to a vehicle equipped with a pneumatic braking system having two braking circuits $a$ and $b$ in which braking pressure is initiated by the vehicle driver operating a brake pedal $c$. The braking control system has the task of providing individual control for the braking effect of the respective wheel $d$ in response to predetermined limit values for slip and acceleraton for the wheel during a braking operation. To achieve this, the braking control system comprises a number of separate means for each individual wheel $d$ and a central module 4 common to the different wheels.

A valve unit 1 is mounted in a brake line to an individual wheel d, said valve unit regulating the flow of the braking medium to and from and to the braking means of the wheel d, under the influence of signals from an electronic unit comprising the common central module 4 and a number of separate modules for each separate wheel d. The separate modules consist of a module 5 or 5' for wheel speed calculation, a module 3 for calculating the pressure rise and fall in the brake line for the wheel d in question, and a valve regulating module 2.

For braking pressure control, it is necessary to obtain information on both the speed of the vehicle and of each individual wheel d, during a braking operation. For measuring the wheel speed of each wheel there is a transducer 6 which generates an alternating voltage having a frequency proportional to the wheel speed, this voltage then being applied to the calculating module 5 or 5' associated with each wheel, and containing in a series circuit a pulse shaper with a frequency doubler, a constant pulse generator and a filter. The signal from the wheel speed transducer 6 is first converted in the pulse shaper, incorporated in module 5 to a square wave, whereafter the frequency doubler senses each pulse flank of the square wave and feeds out a series of short pulses, the frequency of which is converted in the pulse generator to a more suitable control vehicle, this meaning in the present case that the constant pulse generator supplies pulses with constant length and amplitude, i.e., constant voltage-time surface, the integrated average value of said pulses being proportional to the wheel speed. This average value is derived in the subsequent filter, which is of low-pass type and contains two RC-links and an amplifier, so that a DC voltage signal corresponding to this value can be taken off from the filter output. This signal is designated "wheel speed signal" in the following, and is applied to the calculating module 3.

Wheel speed signals from modules 5' associated with the front wheels of the vehicle are applied each in FIG. 2 to its own input of a calculating stage 7 in the centrol module 4, for calculating the vehicle speed and feeding reference signals to the calculating modules 3 for respective wheels d. Vehicle speed calculation, which takes place starting off from the wheel speed before braking, and from an empirically chosen retardation value suitably corresponding to the maximum retardation the vehicle can achieve during braking, is described in the following, first generally and then more in detail.

In the calculating stage 7 there is generated, on the basis of the wheel speed before braking, a signal value which represents the vehicle speed. This value is corrected during a braking operation, with the assistance of a signal generated in a calculating stage 10, representing the vehicle retardation. In the exemplified case the retardation value is preferably set to correspond to the earth's gravitational acceleration, 1 g, but within the scope of the inventive idea the retardation value can be set to values down to 0.5 g. The signal value generated in stage 7 corresponds through the said correction to a predicted vehicle speed. This signal value is compared to in two comparators 71 and 72, incorporated in stage 7, with each one of the instantaneous values of both front wheel speed signals. If the value of at least one of the wheel speed signals from the front wheels exceeds the value of the signal for predicted vehicle speed, the appropriate comparator sends a logical signal which, during the time said difference in signal level is present, causes up-dating of the predicted vehicle speed signal so that it corresponds to the measured wheel speed signal. Up-dating will take place intermittently, since the braking control system causes each wheel during braking to experience a number of regulating cycles, during which the wheel speed alternately increases and decreases.

At the start of a braking control operation a signal is fed into the respective comparators 71,72 representing the individual front wheel speed. Said signal causes a logical output signal to be coupled from either one of the comparators 71,72 to a current generator 73 which, when activated, charges a capacitor 74 to a voltage level corresponding to the wheel speed signal in question. A voltage level stored in such a way corresponds to the speed of the vehicle before braking.

During braking, the true speed of the vehicle is altered in response to retardation. In the method according to the invention, the vehicle speed during braking is predicted by the retardation being assumed to reach an empirically selected value. This is accomplished in the electronic unit by a controlled discharge of the capacitor 74. The calculating stage 10 comprises an integrator circuit 102, whose output signal actuates a current generator 104 to trigger a controlled discharge of the capacitor 74. By setting a certain voltage level for the output signal of the integrator 102, the voltage level of the capacitor 74 can on discharge be lowered with the constant value per time unit corresponding to the empirically selected retardation. In this way the voltage level of the capacitor 74 represents the predicted instantaneous vehicle speed.

A voltage follower 75 is connected to capacitor 74 in such a way that the output signal of the voltage follower is always just as great as the voltage level of the capacitor. The signal from the voltage follower 75 is returned to the comparators 71,72 for obtaining the previously mentioned comparisons with the instantaneous wheel speed signals. If the value of any of the latter signals exceeds the value for the predicted vehicle speed signal, the comparator in question emits a logical signal activating the current generator 73 to provide current for charging the capacitor 74. Through the above-mentioned comparison and the activation of the current generator 73 by the logical contrasignal, an up-dating is obtained of the predicted vehicle speed signal in response to the wheel speed signal. When up-dating ceases, the capacitor 74 is discharged anew by the current generator 104 in response to the retardation value signal from the integrator 102.

In predicting the vehicle speed after an up-dating, a corrected retardation value is used in the method according to the invention. For this purpose the logical signal developed by the comparators 71,72 is also applied to the calculating stage 10, in which the signal actuates a transistor 101 so that a constant current is fed via the transistor to the integrator 102 during the same time that the current generator 73 in stage 7 releases current to the capacitor 74. The current to the integrator 102 charges a capacitor 103 incorporated in the integrator, causing the signal level at the output of the integrator 102 to drop. The drop will be proportional to the supplied charge, which means that direct proportionality exists between the magnitude of the up-dating of the vehicle speed which takes place in stage 7 and the alteration in the signal level from the integrator 102. The output signal from the integrator 102 is applied as previously mentioned to the current generator 104 which discharges the capacitor 74. When the potential of capacitor 74 falls, which takes place more slowly the lower the output signal level from integrator 102 is, the signal level from the voltage follower 75 follows said voltage alteration and thus represents the predicted vehicle speed between up-datings.

From the above it may be seen that prediction of vehicle speed takes place with the assistance of an output signal from the integrator 102. This signal represents the retardation of the vehicle and regulates how quickly the vehicle speed signal shall decline. During the first controlling cycle of a braking operation, the integrator 102 is in its initial state, and its output signal level is such that it corresponds to a predetermined vehicle retardation of 1 g. At each subsequent updating the vehicle speed signal which takes place in stage 7 said signal level is corrected to a new lower value. This means that the vehicle retardation values which are used for predicting the vehicle speed during a braking operation are thus reduced after each up-dating which has been made.

In the case where too long a time has passed since an up-dating, the integrator 102 returns to its initial level. To provide for this there is a comparator 107 arranged in the calculating stage 10, comparing the voltage across a capacitor 106 with a reference voltage determined by the predicted vehicle speed signal from the voltage follower 75. The capacitor is charged in response to the logical signal from the calculating stage 7, and when the capacitor voltage exceeds the reference voltage level, the comparator 107 emits a logical signal which causes the integrator 102 to return to its initial level. If up-dating takes place before the capacitor voltage reaches the reference level, the signal from the integrator 102 will, in the manner described, be corrected in relation to the retardation value existing at the moment in the integrator 102. The reference voltage level is, however, lowered as the predicted vehicle speed signal is reduced during a braking operation, thereby reducing the time remaining before the integrator 102 returns to the initial level.

The above described time comparison and resetting of the retardation value of integrator 102 to the initial value is of especially large importance when braking takes place on a road with a varying coefficient of friction. If braking takes place on a substructure which has a relatively uniform coefficient of friction, the avoidance of such a heavy correction of the vehicle speed would appear to be desirable. For this reason the method according to the invention includes obtaining, in the run-through of the controlling cycles of a braking operation, a small up-dating of the predicted vehicle speed every time the wheel speed increases. With this objective the output signal from the integrator 102 representing the vehicle retardation is increased slowly between up-datings with constant value per time unit, said value being defined by a resistance 108 incorporated in the integrator 102.

On resetting to normal braking function for the vehicle, i.e., when the braking control system is deactivated, the integrator 102 is set to its initial level, which according to the above, represents the empirically selected vehicle retardation, and which is determined by a zener diode 105 connected in parallel with the capacitor 103 in the integrator 102. Switching is done by a signal from a gate 22 which charges the integrator 102 to its predetermined level. The gate 22, which while not described, in detail has the task of deactivating the braking control system when certain control conditions are fulfilled and of returning it to the initial state.

The retardation signal from stage 10, i.e., the output signal from the integrator 102, is transferred to a stage 9 for the formation of a reference value for wheel retardation. The predicted wheel speed signal from stage 7 is also supplied to stage 9. The wheel retardation reference value formed will be directly dependent on these two input magnitudes, i.e., both the vehicle speed and retardation.

The predicted vehicle speed signal from stage 7 is also applied to a stage 8 for forming a reference value for wheel slip. This value is obtained by scaling down the vehicle speed signal, and increases relatively with diminished vehicle speed.

The reference value signals from the stages 8 and 9 in the central module 4 are intended to be applied to module 3 at each wheel for comparison with the signals corresponding to retardation and speed at the individual wheels.

In the central module there is also a low speed comparator 11, which has the task of triggering normal braking if vehicle speed is too low. To do this the predicted vehicle speed signal from stage 7 is compared in the low speed comparator 11 with a predetermined reference value representing the speed limit at which the braking control system is deactivated. The comparator 11 is however constructed for a hysteresis function by means of a return loop, whereby it gives a lower value on passing through the limit during retardation than under the opposite sequence of events.

The principle for up-dating and predicting vehicle speed described above may be seen from FIG. 3. Curve A gives the peripheral wheel speed, B the predicted vehicle speed and C the true vehicle speed. During braking the wheel speed A falls below true vehicle speed and since the braking control system during braking causes each wheel to pass through a number of controlling cycles during which the wheel slip alternately increases and decreases, the wave-shaped wheel speed curve A is obtained.

At the first controlling cycle the wheel speed value before braking begins constitutes the starting point for predicting the vehicle speed B, the instantaneous value thereof subsequently being determined with the assistance of the empirically selected initial value for vehicle retardation represented by the output signal of integrator 102 in its initial state. Continuous comparison takes place in the comparators 71 and 72 between the predicted vehicle speed and the speeds of both the front wheels, and as soon as any wheel speed exceeds the predicted vehicle speed, the latter is updated to correspond to the wheel speed level, this taking place in FIG. 3 at the wave peaks of curve A. The size dV of the up-dating is then a basis for reducing the preselected retardation value used for the first prediction. The reduction takes place in the integrator 102, and the new lower retardation value obtained thereby is used for renewed prediction of the vehicle speed. At the next peak on the wheel speed graph a new up-dating of the predicted vehicle speed takes place, and then a new prediction on the basis of this, etc. If the vehicle were to come onto a substructure with a heavily increased coefficient of fricton during braking, there is however, the risk that the predicted vehicle speed exceeds the wave peak of the wheel speed, the result being that up-dating does not take place. After a certain time and with the help of comparator 107 a return to the prediction of vehicle speed with the integrator 102 in its initial state, i.e., with the largest retardation value takes place. The somewhat curved graph showing the predicted vehicle speed between up-datings is intended to illustrate the retardation increasing effect which the resistance 108 in the integrator 102 has.

The method according to the invention is not restricted to the exemplified central module, but may be modified in alternative embodiments within the scope of the following claims.

What I claim is:

1. A method for generating a predicted speed signal representative of a predicted vehicle speed during braking for use in an anti-skid braking system, said method comprising the steps of:

generating a predicted speed signal representative of the actual speed of a vehicle prior to the initiation of a braking operation;

decreasing the value of said predicted speed signal at a first preselected empirical rate upon the initiation of a braking operation;

performing an updating step including comparing said predicted speed signal to an actual speed signal representative of the actual instantaneous peripheral speed of a wheel of said vehicle and generating an updating signal each time said actual speed signal indicates that the actual instantaneous peripheral speed of said wheel is greater than the predicted speed as determined by said predicted speed signal;

increasing the value of said predicted speed signal each time a new up-dating signal is generated until said predicted speed signal reaches a value which is representative of a speed which is greater than the actual instantaneous peripheral speed of said wheel; and thereafter decreasing the value of said predicted speed signal at an up-dated rate proportional to the time period extending from the time when said last up-dating signal was generated until the time when said predicted speed of said vehicle as indicated by the predicted speed signal last rose above a value which was equal to the instantaneous peripheral speed of said wheel; and continuously increasing the rate at which said predicted speed signal is decreased during the time between successive updating steps.

2. A method for generating a predicted speed signal representative of a predicted vehicle speed during braking for use in an anti-skid braking system, said method comprising the steps of:

generating a predicted speed signal representative of the actual speed of a vehicle prior to the initiation of a braking operation;

decreasing the value of said predicted speed signal at a first preselected empirical rate upon the initiation of a braking operation;

performing an updating step including comparing said predicted speed signal to an actual speed signal representative of the actual instantaneous peripheral speed of a wheel of said vehicle and generating an up-dating signal each time said actual speed signal indicates that the actual instantaneous peripheral speed of said wheel is greater than the predicted speed as determined by said predicted speed signal;

increasing the value of said predicted speed signal each time a new up-dating signal is generated until said predicted speed signal reaches a value which is representative of a speed which is greater than the actual instantaneous peripheral speed of said wheel; and thereafter decreasing the value of said predicted speed signal at an up-dated rate proportional to the time period extending from the time when said last up-dating signal was generated until the time when said predicted speed of said vehicle as indicated by the predicted speed signal last rose above a value which was equal to the instantaneous peripheral speed of said wheel; and measuring the time intervals between the generation of successive up-dating signals and decreasing the value of said predicted speed signal at said first preselected empirical rate whenever said interval exceeds a predetermined time period.

3. Apparatus for predicting vehicle speed of a wheeled vehicle to provide for a series of periodic reductions in braking force under electronic control comprising:

charge storage means;

wheel speed means for generating a signal level representing the speed of a wheel;

comparator means for charging said charge storage means whenever the signal level generated by said wheel speed means is greater than the level of charge stored by said charge storage means;

discharging means coupled to said charge storage means for discharging said charge storage means at a rate determined by a control level applied to its control input;

discharge rate control means responsive to said comparator means for applying a control level at said control level at said control input to reduce the discharge rate when the wheel speed signal level is reduced;

said discharge rate control means comprising means for storing a control level, said level being decreased each time said wheel speed is reduced and being maintained at the decreased level for the next braking operation.

4. The apparatus of claim 3 wherein said storing means further comprises second storage means and means for charging said second storage means responsive to initiation of a braking operation;

second comparison means responsive to said second storage means and the level of said first storing means for resetting said discharge rate control means;

means controlling the charging rate of said second storage means to cause resetting after a time delay which exceeds the normal time interval for up-dating the level of said first storing means.

5. The apparatus of claim 3 further comprising disabling means responsive to the level of said first storing means for generating a disabling signal to disable the electronic control and thereby restore normal braking when the level of said first charging means drops below a predetermined threshold.

6. The apparatus of claim 5 further comprising means coupled to said disabling means for resetting said discharge control means responsive to said disabling signal.

7. The apparatus of claim 3, wherein said first storing means includes a capacitor and said discharge control means comprises an integrator.

8. The apparatus of claim 7, wherein said integrator comprises an operational amplifier having a feedback path comprising a capacitor coupled between the output and one input of said amplifier;

a zener diode being coupled across said capacitor and adapted to provide an initial level representing an empirically determined vehicle retardation value, said value representing a deceleration at a rate in the range between 0.5 and 1.0 g where g is the earth's gravitational acceleration.

9. The apparatus of claim 7 further comprising means for increasing the output level of the integrator at a slow predetermined rate when said first storing means is being discharged.

10. The apparatus of claim 3, wherein the output level of said first storing means represents predicted vehicle speed and the output level of said discharge control means represents the rate of vehicle retardation;

means responsive to the levels of said predicted vehicle speed and said vehicle retardation for generating a retardation reference level.

11. The apparatus of claim 3, wherein the output level of said first storing means represents predicted vehicle speed and the output level of said discharge control means represents the rate of vehicle retardation;

means responsive to the levels of said predicted vehicle speed and said vehicle retardation for generating a wheel slip reference level.

12. A method for generating a predicted speed signal representative of a predicted vehicle speed during braking for use in an anti-skid braking system, said method comprising the consecutive steps of;

a. charging a capacitor to a level representing the speed of said vehicle just prior to the initiation of a braking operation;

b. discharging said capacitor at a first predetermined retardation rate upon initiation of a braking operation, said predetermined retardation rate being a preselected empirical vehicle retardation value, said retardation rate altering the voltage across the capacitor to prove a level representing a predetermined vehicle speed during braking;

c. releasing the braking force applied to a wheel of said vehicle to permit said wheel to attain a speed representative of the actual speed of said vehicle;

d. charging said capacitor to an up-dated level representing the speed of said vehicle as indicated by the rotational speed of said wheel if the speed of said vehicle is greater than a predicted speed of said vehicle as determined by said voltage across said capacitor;

e. discharging said capacitor at an up-dated rate proportional to the difference between the speed of said vehicle as indicated by the rotational speed of said wheel and the predicted speed of said vehicle as determined by said voltage across said capacitor;

f. reapplying the braking force to said wheel and discharging said capacitor at said new retardation rate during reapplication of the braking force; and continuously decreasing the rate at which said capacitor is discharged each time the predicted speed of said vehicle as determined by said voltage across said capacitor rises above the actual instantaneous speed of said vehicle as indicated by the rotational speed of said wheel and maintaining the decreased rate for the next braking operation.

13. The method of claim 12 further comprising the repetition of steps (c) through (f) to predict the speed of said vehicle, and measuring the elapsed time intervals between successive up-datings of said capacitor level and automatically resetting said capacitor discharge rate to said empirical value when said intervals exceed a predetermined threshold.

* * * * *

UNITED STATES PATENT AND TRADEMARK OFFICE
CERTIFICATE OF CORRECTION

PATENT NO. : 4,089,564
DATED : May 16, 1978
INVENTOR(S) : Ulf Erik Oberg

It is certified that error appears in the above-identified patent and that said Letters Patent are hereby corrected as shown below:

Column 3, line 26, "vehicle" should read --variable--.

Column 3, line 40, "centrol" should read --central--.

Column 5, line 32, after "reference" insert --voltage--.

Signed and Sealed this

Twenty-sixth Day of September 1978

[SEAL]

Attest:

RUTH C. MASON
Attesting Officer

DONALD W. BANNER
Commissioner of Patents and Trademarks